United States Patent [19]

Okita et al.

[11] Patent Number: 4,880,577
[45] Date of Patent: Nov. 14, 1989

[54] PROCESS FOR PRODUCING SELF-RESTORING OVER-CURRENT PROTECTIVE DEVICE BY GRAFTING METHOD

[75] Inventors: Kumakazu Okita, Chiba; Toshiaki Abe, Tokyo; Masaru Kiriyama, Kanagawa, all of Japan

[73] Assignee: Daito Communication Apparatus Co., Ltd., Tokyo, Japan

[21] Appl. No.: 221,333

[22] Filed: Jul. 19, 1988

[30] Foreign Application Priority Data

Jul. 24, 1987 [JP] Japan .................................. 62-184997

[51] Int. Cl.[4] .............................................. B29C 35/08
[52] U.S. Cl. ..................................... 264/22; 252/511; 264/105
[58] Field of Search ......................... 264/22, 104, 105; 252/511

[56] References Cited

U.S. PATENT DOCUMENTS

| | | | |
|---|---|---|---|
| 3,914,363 | 10/1975 | Bedard et al. | 264/105 |
| 4,237,441 | 12/1980 | van Konynenburg et al. | 252/511 |
| 4,318,881 | 3/1982 | Sopory | 264/105 |
| 4,511,445 | 4/1986 | Forrest et al. | 264/22 |
| 4,514,620 | 4/1985 | Cheng et al. | 264/105 |
| 4,775,500 | 10/1988 | Funakoshi et al. | 264/22 |

FOREIGN PATENT DOCUMENTS

| | | | |
|---|---|---|---|
| 2901758 | 7/1980 | Fed. Rep. of Germany | 264/104 |
| 51-36876 | 10/1976 | Japan . | |
| 56-8443 | 1/1981 | Japan . | |

OTHER PUBLICATIONS

"Carbon Black Graft Polymer Having Network Structure", *Journal of the Soc. of Rubber Industry*, Okita et al., vol. 44, No. 1, pp. 63–68, 1971.

Primary Examiner—Jeffery Thurlow
Attorney, Agent, or Firm—James E. Nilles

[57] ABSTRACT

A process for producing a self-restoring overcurrent protective device by the grafting method, wherein an organic peroxide is added to colloidal graphite, at least one kind of carbon black selected from among acetylene black, Ketjen black and furnace black having a high structure, and at least one kind of crystalline polymer substance while heating and milling the latter three components, and the heated mixture having a high viscosity is forcibly milled, whereby the organic peroxide is reacted with the polymer substance to give unpaired electrons to the polymer substance to thereby form polymer radicals. Subsequently, the formed polymer radicals are preferentially grafted onto the above-mentioned graphite and carbon black to form a milled mass wherein the grafting products are homogeneously dispersed in the above-mentioned polymer substance. The milled mass is molded into a predetermined shape while it still retains thermoplasticity. Subsequently, the above-mentioned organic peroxide not involved in the formation of the above-mentioned polymer radicals is thermally decomposed to crosslink the above-mentioned grafting products and polymer substance, whereby a molding having a three-dimensional network structure is obtained.

5 Claims, 3 Drawing Sheets

PROCESS FOR PRODUCING SELF-RESTORING OVER-CURRENT PROTECTIVE DEVICE BY GRAFTING METHOD

BACKGROUND OF THE INVENTION

1. Field of the Invention

The present invention relates to a process for producing a self-restoring overcurrent protective device which undergoes heat buildup upon flowing therethrough of an overcurrent to increase the resistance thereof to thereby limit the current and is reversibly self-restored stably to an original state thereof upon returning of a circuit to a normal state thereof by utilizing the phenomenon of the same as a positive temperature coefficient thermistor (hereinafter referred to briefly as the "PTC").

2. Description of the Prior Art

Conventional processes for producing a resistor or a device which utilizes the PTC characteristics thereof include the following ones:

(i) a process for producing a resistor having PTC characteristics which comprises sintering a semiconductor of a barium titanate type at a high temperature to form a device;

(ii) a process for producing a relatively low resistance PTC device comprising a polymer substance and carbon black incorporated thereinto, an example of which is a process for producing a device having PTC characteristics as disclosed in U.S. Pat. No. 4,237,441 which comprises molding a mixture of a crystalline polymer and carbon black into a predetermined shape with an extruder and irradiating the resulting molding with a radiation such as electron beams to crosslink the crystalline polymer between the molecules thereof to form a network structure, thereby improving the molding in the thermal deformation thereof;

(iii) a process for producing a resistor having PTC characteristics as disclosed in, for example, Japanese Patent Laid-Open No. 8,443/1981 which comprises molding a mixture of a rubbery substance, carbon black, graphite, an organic peroxide, and the like into a predetermined shape and heating the resulting molding to decompose for the first time the organic peroxide whereupon a network structure is given to the rubbery substance to improve the molding in the thermal deformation thereof; and (iv) a process for producing a resistor having PTC characteristics as disclosed in, for example, Japanese Patent Publication No. 36,876/1976 which comprises graft-copolymerizing a vinyl monomer onto carbon black in a solvent, adding a cross-linking agent to the resulting kneaded mass, and heating the resulting mixture to give a network structure thereto for attaining an improvement in the thermal resistance thereof.

The above-mentioned conventional process (i) comprising sintering a semiconductor of a barium titanate type at a high temperature involves problems that, since the resulting device has a high volume resistivity, the voltage drop of a circuit at a steady-state current is large, that, when the temperature of the device is further raised after the manifestation of PTC characteristics, the device turns into a negative temperature coefficient thermistor (hereinafter referred to briefly as the "NTC") so that the current-limiting function thereof is drastically reduced, and that scattering of resistance values is liable to occur due to the deformation of the device caused by sinter molding at a high temperature.

The above-mentioned conventional processes (ii) and (iii) comprising crosslinking a crystalline polymer substance admixed with carbon black or a rubbery substance admixed with carbon black and graphite provide a thermally stable PTC material as a heater which acts as an overcurrent protective device, but involve a problem that part of carbon black particles or part of carbon black and graphite particles move due to segment expansion and contraction in a crosslinked network structure during the course of repeated current-limiting actions of the PTC device as the overcurrent protective device to lower the reproducibility of PTC characteristics and resistance value between the repeated actions and particularly to largely vary the resistance value therebetween.

The above-mentioned conventional process (iv) comprising graft-copolymerizing a vinyl monomer onto carbon black in a solvent involves a problem that the compatibility of the resulting crystalline polymer substance with the solvent during the course of graft copolymerization is so problematic because of the use of the solvent in the graft copolymerization that polyethylene and polypropylene which are crystalline polymer substances effective in manifestation of PTC characteristics cannot be employed.

It is known to use an organic peroxide, such as dicumyl peroxide, as a network-forming agent for an ethylene-propylene rubber and the like. Where such an organic peroxide is added to a rubber and they are roll-milled, roll milling is conducted at a comparatively low temperature, for example, around 50° C., for the purpose of preventing gelation (network formation) during the course of milling. In an unavoidable case, particularly in the case of using a crystalline substance such as polyethylene, a method like one in which addition of the organic peroxide is completed in a comparatively short time is employed with consideration given to an indication of the thermal decomposition rate of the organic peroxide, namely the half-life thereof. This is done for the purpose of suppressing the decomposition of the organic peroxide as much as possible during the course of milling.

Accordingly, milling of a polymer substance with an organic peroxide at or above the thermal decomposition temperature thereof to allow both to react with each other during the course of milling has heretofore been avoided as much as possible.

Meanwhile the inventors of the present invention have found an interesting fact that, when an adequate amount of an organic peroxide is added while milling a crystalline polymer substance in the presence of graphite and carbon black, the organic peroxide does not serve as a crosslinking agent for the polymer but, instead, acts as a grafting agent to enable the polymer to be grafted onto the surfaces of graphite and carbon black particles even during the course of milling at or above the thermal decomposition temperature of the organic peroxide.

SUMMARY OF THE INVENTION

An object of the present invention is to provide a process for producing a self-restoring overcurrent protective device having a low resistance value and PTC characteristics particularly with a good reproducibility of PTC characteristics and resistance value in repeated current-limiting actions according to the grafting method.

In accordance with an embodiment of the process for producing a self-restoring overcurrent protective device by the grafting method according to the present invention, in the first step thereof, an organic peroxide is added to colloidal graphite, at least one kind of carbon black selected from among acetylene black, Ketjen black and furnace black having a high structure, and at least one kind of crystalline polymer substance while heating and milling the latter three components, and the heated mixture having a high viscosity is forcibly milled, whereby the organic peroxide is reacted with the polymer substance to give unpaired electrons to the polymer substance to thereby form polymer radicals. Subsequently, the formed polymer radicals are preferentially grafted onto the abovementioned graphite and carbon black to form a milled mass wherein the grafting products are homogeneously dispersed in the above-mentioned polymer substance. The milled mass is molded into a predetermined shape while it still retains thermoplasticity. Subsequently, in the second step, the above-mentioned organic peroxide not involved in the formation of the above-mentioned polymer radicals is thermally decomposed to crosslink the above-mentioned grafting products and polymer substance, whereby a molding having a three-dimensional network structure is obtained.

In accordance with another embodiment of the present invention, a first organic peroxide for grafting a polymer substance onto graphite and carbon black and a second organic peroxide for crosslinking added in respective different steps in the above-mentioned embodiment.

In accordance with a further embodiment of the present invention, after the milled mass has been molded, the molded mass is irradiated with radial ray to crosslink the grafting products and polymer substance, whereby a molding having a three-dimensional network structure is obtained in the first embodiment.

According to the present invention, since colloidal graphite and carbon black are added to a crystalline polymer substance and part of the crystalline polymer substance is grafted onto the surfaces of the graphite and carbon black particles in the presence of an organic peroxide while heating and milling them with a mixing roll mill or the like, a solution is worked out for a problem that grafting of the polymer substance onto graphite or carbon black particles alone increases the resistance value of the resulting device though it improves the dispersibility of the particles in the polymer substance, and a stable PTC device which has a low resistance and can resist repeated current-limiting actions is obtained.

Other objects and features of the present invention will be apparent while illustrating the invention with reference to the attached drawings.

DESCRIPTION OF THE PREFERRED EMBODIMENTS

Figure 1:
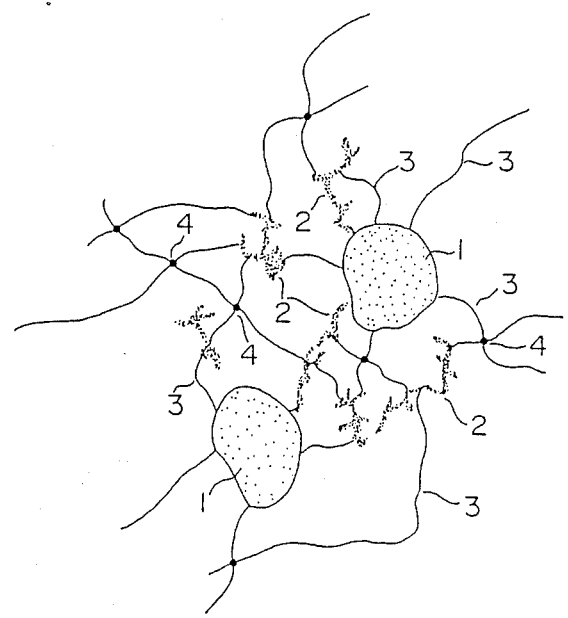
FIG. 1 is a model diagram of a graft polymer comprising polymer molecules grafted onto graphite and carbon black particles in a device obtained by the process of the present invention.

Prior to the description of Examples of the present invention, description will be made of (i) colloidal graphite, carbon black having a high structure, a crystalline polymer substance, an organic peroxide, and the like; (ii) the mechanism of a graft reaction and that of network formation; (iii) an experiment conducted for confirming that a polymer substance is grafted onto graphite particles; and (iv) an experiment conducted for confirming the suitable amount of an organic peroxide consumed as a grafting agent.

(i) Description will be made of colloidal graphite, carbon black having a high structure, a crystalline polymer substance, and an organic peroxide.

Colloidal graphite is a powder prepared by pulverizing graphite into fine particles with a mechanical means and has oxygen-containing groups on the surfaces of the particles thereof.

Furnace black having a high structure is composed of aggregates consisting of a large number of fine particles connected to each other in a chain-like form, and is desired to have an oil absorption of 1 ml/g or more as an indication of the structure.

Carbon black is mixed with graphite since the mixture can impart a lower resistance value to the resulting device than graphite alone. The mixing ratio of graphite to carbon black is desirably in the range of 1:9 to 8:2 by weight. One or two kinds of carbon blacks are selected from among furnace black, acetylene black, and Ketjen black depending on the resistance value required of the resulting device. The resistance value of the device can be reduced in the order of furnace black, acetylene black, and Ketjen black.

Although the mixing ratio of the amount of graphite and carbon black particles to that of a crystalline polymer substance can be varied depending on the desired resistance value of the resulting device, a device having desirable physical strengths and a low resistance value can be obtained when the above-mentioned mixing ratio is in the range of 6:4 to 3:7 by weight.

The crystalline polymer substance is a polymer having a melting point of, for example, 90° to 180° C. and desirably containing hydrogen atoms or methylene groups bonded to tertiary carbon atoms in its structure, examples of which include low-density polyethylene, medium-density polyethylene, high-density polyethylene, polypropylene, and polyesters. The crystalline polymer substance is used for the purpose of notably manifesting the PTC characteristics of the resulting device around the melting point of the polymer substance.

The organic peroxide is a peroxide involving no danger of explosion during the course of milling therewith the graphite particles and the crystalline polymer substance at a temperature ranging from 90° C. to 200° C., allowing the milling operation to be comparatively easily effected, and having a capability of reacting with the crystalline polymer substance to give unpaired electrons to the polymer substance, examples of which include bis ($\alpha$, $\alpha'$-dimethylbenzyl)-peroxide (dicumyl peroxide, hereinafter referred to briefly as "Di-Cup") and 2,5-dimethyl-2,5-di(t-butylperoxy)hexyne-3 (hereinafter referred to briefly as "TBPH-3"). Besides, use may be made of 2,5-dimethyl-2,5-di(t-butylperoxy)-hexane, 1,1-di(t-butylperoxy)-3,3,5-trimethylcyclohexane, or the like.

The term "suitable amount of the organic peroxide" means an amount thereof involving no fear of gelation due to network formation during the course of milling therewith the graphite particles, the carbon black particles and the crystalline polymer substance, and still being enough to enable part of the polymer substance to be grafted onto the surfaces of the graphite particles and the carbon black particles. This amount is determined depending on the amount of polymer radicals to be formed which are to be preferentially captured by the surfaces of the graphite particles and the carbon black particles during the course of milling. The suitable amount can be determined by rough calculation from the number of radical-capturing sites on the surfaces of these particles, which is regarded as $10^{20}$/g, and the molecular weight of an organic peroxide to be used. For example, in the case of Di-Cup, since the molecular weight thereof is 270, a suitable amount thereof is about 5 g per 100 g of particles (of graphite and carbon black) on the assumption that the proportion of Di-Cup to effectively act on the crystalline polymer substance is about 80% with consideration given to the secondary decomposition thereof to form acetophenone and the like. Moreover, since the half-life of Di-Cup is known to be 1 minute at 171° C., the organic peroxide remaining in milling serves to form a network in the resulting device. Furthermore, it is desirable in network formation to add an organic peroxide which decomposes at a temperature higher than the decomposition temperature of Di-Cup. An example of such an organic peroxide is TBPH-3 which is known to have a half-life of 1 minute at 193° C. Addition of TBPH-3 to a milled mass as mentioned hereinbefore is desirable because it provides little function and effect of TBPH-3 as a network-forming agent by virtue of its low thermal decomposition rate even when the resulting mixture is further milled at a temperature around 140° C. In other words, gelation of the above-mentioned milled mass can be completely suppressed.

Although the conditions of formation of a three-dimensional network structure to be given to a device depend on the thermal stability of an organic peroxide to be used, it is generally desirable that they involve a heat treatment temperature of 160° to 200° C. and a heat treatment time of 5 to 60 minutes.

In case of irradiating radial ray, it is desirable to use $\gamma$ ray of 5–40 Mrad.

(ii) Description will be made of the mechanism of a graft reaction and that of network formation by taking as an example a case where polyethylene is used as the crystalline polymer while Di-Cup is used as the organic peroxide.

Firstly, in the step of heating and milling, Di-Cup decomposed according to the following formula:

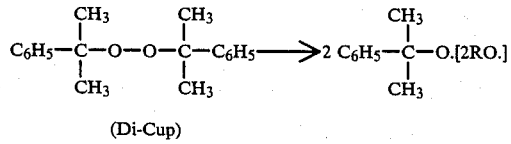

(Di-Cup)

Subsequently, part of hydrogen atoms present in the main chain of a polyethylene molecule are abstracted by RO. to form polyethylene radicals (P.):

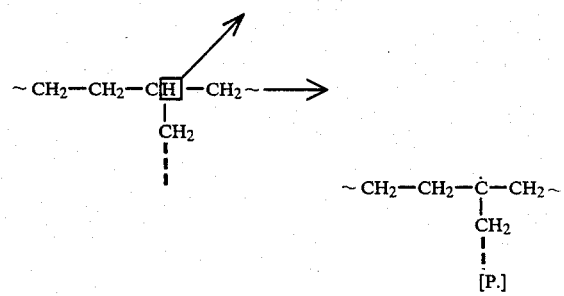

(Note) This reaction formula shows abstraction of a hydrogen atom which occurs at a branched site of a polyethylene molecule.

If RO. is bonded to a phenoxy radical or the like present on the surface of a graphite particle or a carbon black particle, a peroxide is formed. Since this peroxide is unstable, however, a graft reaction involving bonding of RO. to P. and represented by the following formula preferentially proceeds:

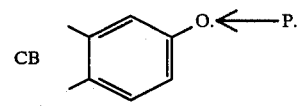

In the formula, CB indicates a graphite or carbon black particle.

Among others, grafting proceeds in the presence of graphite and carbon black particles in advance of a crosslinking reaction of P. with another P.. Thus, grafting can be preferentially allowed to proceed while suppressing network formation by the reaction between molecules of the polymer substance when the amount of an organic peroxide capable of forming P necessary for grafting is determined beforehand on the basis of the molecular weight of the organic peroxide and with consideration given to the number of reactive sites present on the surfaces of graphite and carbon black particles (approximately $10^{20}$/g; see Kumakazu Okita, "Carbon Black no Graft-ka (Grafting onto carbon Black)" published by K.K. Rubber Digest) and the milling temperature is controlled with consideration given to the half-life of the organic peroxide resulting from the thermal decomposition thereof. In this way, graphite particles and carbon black particles can be homogeneously dispersed in the polymer substance with the progress of grafting while retaining the thermoplasticity inherent in the polymer substance. This provides a feature that the resistance value of the resulting device is uniform everywhere therein.

After the grafting, the milled mass is formed into a suitable device and then exposed to a temperature condition capable of decomposing the whole of the organic peroxide to provide a three-dimensional network structure inside the resulting device. Alternatively, the same organic peroxide as that first added or a second new organic peroxide of a different kind is further added in an amount necessary for providing a denser network structure of the crystalline polymer substance to the milled mass, and the resulting mixture is milled, formed into a device, and then heated while keeping the above-mentioned shape to complete the crosslinking reaction. The second organic peroxide to be newly added is desirably a compound having a relatively high decomposition temperature, a suitable example of which is TBPH-3.

FIG. 1 is a model diagram of a graft polymer comprising polymer molecules grafted onto graphite and carbon black in the obtained device, wherein graft polymer molecules 3 extend in a chain-like form from graphite particles 1 and carbon black particles 2 and are connected to each other at crosslinkage sites 4 to form a network structure.

(iii) Description will be made of an experiment conducted for confirming that a polymer substance is grafted onto graphite particles.

If isolation of a grafting product is possible, it can be confirmed by examining the thermally decomposed matter of polymer combined with the surfaces of particles thereof according to gas chromatography that a crystalline polymer substance such as polyethylene or polypropylene is grafted onto the surfaces of graphite particles by using an organic peroxide such as Di-Cup during the course of milling with a heated roll mill. Since no suitable solvent was available, however, grafting was indirectly confirmed by using a homopolymer of 2-ethylhexyl methacrylate (hereinafter referred to briefly as "P-OMA") having hydrogen atoms bonded to a methylene chain and tertiary carbon atoms in its structure as a polymer substance having a structure analogous to those of polyethylene, polypropylene, and the like. Confirmation was also made of the phenomenon that polymer radicals were grafted onto the surfaces of graphite particles and the fact that the grafting sites of graphite particles have a structure of a phenoxy radical.

Confirmation of grafting of P-OMA was made according to the following method.

P-OMA synthesized by another method was milled together with graphite with a heated roll mill at a blending ratio as shown in Table 1.

TABLE 1

| Sample | Amounts of Materials in Milled Mass [g] | | |
|---|---|---|---|
| | Graphite | P-OMA | Di-Cup |
| A | 20 | 30 | 0.8 |
| B | 20 | 30 | 0 |
| C | 0 | 30 | 0.8 |

Subsequently, the milled mass was dispersed in methyl isobutyl ketone (hereinafter referred to briefly as "MIBK") and the resulting dispersion was subjected to centrifugal separation at 4,000 rpm for one hour, followed by observation of the state of the supernatant liquid. Sample A alone gave a black supernatant liquid, while Samples B and C gave transparent supernatant liquids. The black supernatant liquid resulted from grafting of P-OMA onto the surfaces of the graphite particles. Specifically, a radical (R.O.) formed by thermal decomposition of Di-Cup abstracts a hydrogen atom bonded to a tertiary carbon atom of P-OMA to form a polymer radical (P.), which then reacts with a phenoxy radical present on the surface of a graphite particle to graft thereonto.

Graphite particles onto which P-OMA is grafted in the above-mentioned way are improved in dispersibility in MIBK so that they are less liable to precipitate by centrifugal separation. This substantiates that, when graphite and P-OMA are milled together with Di-Cup with a heated roll mill, P-OMA is grafted onto the surfaces of graphite particles.

By isolating a grafting product from the milled mass and examining the thermally decomposed matter thereof according to gas chromatography, it was confirmed that the grafting product was P-OMA.

Another experiment will be described to substantiate grafting of polymer radicals onto the surface of graphite particles.

It has heretofore been said that the surfaces of graphite particles are inactive. However, the inventors of the present invention have found that active free radicals, namely unpaired electrons, are present on the surfaces of graphite particles and these unpaired electrons easily react with polymer radicals to bring about grafting. For example, 1 g of graphite particles and 20 cc of styrene were well stirred at 90° C. for 20 hours to effect a reaction, and the reaction product was dispersed in 60 cc of toluene. For comparison, 20 cc of styrene alone was polymerized at 90° C. for 20 hours and the polymerization product was mixed with 1 g of graphite particles and 60 cc of toluene to prepare a dispersion.

The two dispersions were allowed to stand for 2 days and were observed. All graphite particles precipitated in the dispersion prepared by merely mixing the materials, while the supernatant liquid of the dispersion prepared by reacting graphite particles with styrene assumed the color of graphite though there was a precipitate.

The fact that the supernatant liquid assumed the color of graphite substantiates that polystyrene radicals reacted with unpaired electrons present on the surfaces of graphite particles to bring about grafting.

From the above results, it can be easily presumed that, when graphite particles and a crystalline polymer substance such as polyethylene or polypropylene are milled in the presence of an organic peroxide with a heated roll mill, polymer radicals are grafted onto the surfaces of the graphite particles.

An experiment was conducted to confirm that the main oxygen-containing groups present on the surfaces of graphite particles are phenoxy radicals Use was made of a difference in reactivity between benzoyl peroxide (hereinafter referred to briefly as "$Bz_2O_2$") and α, α'-azobisisobutyronitrile (hereinafter referred to briefly as "AIBN") as polymerization initiators for effecting a reaction of graphite with polystyrene. If phenoxy radicals are present on the surfaces of graphite particles, two kinds of reactions, namely bonding of phenoxy radicals to 2-cyano-2-propyl radicals formed by thermal decomposition of AIBN and bonding of phenoxy radicals to polystyrene radicals, must compete with each other in a reaction system using AIBN. In this case, if phenoxy radicals are bonded to 2-cyano-2-propyl radicals, the dispersibility of the reaction product in solvents is poor. In contrast, where $Bz_2O_2$ is used, only grafting of polystyrene proceeds so that a colloidal dispersion of the reaction product is more stable. In this experiment, two reaction systems, namely one composed of 1 g of graphite particles, 20 cc of styrene and 0.3 g of $Bz_2O_2$, and one composed of 1 g of graphite particles, 20 cc of styrene and 0.2 g of AIBN, were each stirred at 80° C. for one hour to effect respective reactions for comparison, $Bz_2O_2$ and AIBN were used in substantially the same molar amount. The two reaction products were each dispersed in 40 cc of toluene and allowed to stand at room temperature for 5 days. Colloidal particles in the dispersion of the reaction product prepared using Bz$_2$O$_2$ were more stable than those in the dispersion of the reaction product prepared using AIBN. The above results may be understood to prove the presence of phenoxy radicals on the surfaces of graphite particles.

Reference materials relevant to the above experiments include:

① "Amimekozo o motsu Carbon Black Graft Polymer (Carbon Black Graft Polymer Having Network Structure)" (Okita et al., Journal of the Society of Rubber Industry, Japan, Vol. 44, No. 1, pp. 63 to 68, 1971);

② "Carbon Black Graft Polymer no Denkiteki Seishitsu (Electrical Properties of Carbon Black Graft Polymer)" (Tsubata et al., Niigata-daigaku Kogaku-bu Kenkyu Hokoku, No. 15 pp. 71 to 81, 1966);

③ "Carbon Black Graft Polymer (2)" (Okita, Polymer no Tomo, Vol. 2, (10), pp. 10 to 17, 1965); and ④ "Carbon Black Graft polymer (3)" (Okita, Polymer no Tomo, Vol. 2, (11), pp. 8 to 17, 1965).

(iv) Description will be made of an experiment conducted for confirming the suitable amount of an organic peroxide consumed as a grafting agent.

The organic peroxide has the roles of a grafting agent and a crosslinking agent for a crystalline polymer substance. However, the organic peroxide is consumed as the grafting agent in the presence of graphite and carbon black particles because of a preferential reaction of grafting of polymer radicals onto the surfaces of the above-mentioned particles, while the polymer is crosslinked with any surplus of the organic peroxide. Accordingly, the suitable amount of an organic peroxide as the grafting agent can be found by examining the extents of gelation, due to network formation, of milled masses respectively containing appropriately varied amounts of the organic peroxide during the course of milling. Further, whether or not any amount of the organic peroxide remains in a milled mass can be confirmed by the state of molding of the milled mass.

Materials and amounts of blending thereof used in the experiment are shown in Tables 2 and 3, respectively.

TABLE 2

| Function and name (abbreviation) | | Materials Maker (grade) | Remarks |
|---|---|---|---|
| Conductive particles | natural graphite powder (graphite) | Nippon Kokuen Kogyo K.K. (ACP-1000) | particle size: 6 μm |
| | furnace black (CB) | Cabot, U.S.A. (Vulcan XC-72) | oil absorption: 1.78 ml/g |
| Crystalline polymer | polyethylene (PE) | Mitsui Petrochemical Industries, Ltd. (Hi-Zex 1300J) | M.P.; 131° C. |
| Grafting agent and crosslinking agent | dicumyl peroxide (Di-Cup) | Nippon Oil and Fats Co., Ltd. (Percumyl D) | half-life: 1 min. (171° C.) |

TABLE 3

| | Blending of Materials (g) | | | |
|---|---|---|---|---|
| Sample | CB | Graphite | PE | Di-Cup |
| I | 40 | 60 | 100 | 0 |
| II | 40 | 60 | 100 | 2 |
| III | 40 | 60 | 100 | 4 |
| IV | 40 | 60 | 100 | 6 |
| V | 40 | 60 | 100 | 8 |

A test mixing roll mill was used as a milling apparatus.
size of rolls: 150 mm φ×300 mm
rotation of rolls:
    front roll: 20 rpm
    back roll: 25 rpm
heating system: Dowtherm oil vapor
roll spacing during milling: about 0.5 mm
The procedure of milling is as follows.

① roll surface temperature is set at about 140° C.

② A predetermined amount of high-density polyethylene is placed on the rolls. It is molten into sticky matter and wound around the rolls.

③ A predetermined amount of graphite particles are placed on the rolls. A turnover operation with a metallic spatula is continued for 5 minutes.

④ A predetermined amount of carbon black is placed on the rolls. The turnover operation with the metallic spatula is continued for about 15 minutes.

⑤ A predetermined amount of Di-Cup is incorporated into a milled mass over about one minute while continuing the turnover operation with the metallic spatula ⑥ The state of the milled mass is observed while continuing the turnover operation with the metallic spatula.

Since a milled mass after placing a predetermined amount of CB on the rolls and continuing the turnover operation with the metallic spatula for about 15 minutes in the step ④ of the procedure of milling has a sufficient thermoplasticity and assumes a slightly sticky state, it sometimes happens that it sticks to the surfaces of the rolls so that the turnover operation cannot smoothly be carried out. With this state of the milled mass as a standard, the variation in the state of the milled mass is observed while continuing the turnover operation. The obtained results will be shown hereinbelow. Milling was terminated after 30 minutes from the beginning thereof, except for the case of Sample No. V where milling was terminated after 10 minutes because it became leather-like after 10 minutes.

Sample No. I (Di-Cup: 0 g): without incorporation of Di-Cup, milling was continued for 30 minutes. The state of a milled mass did not change at all.

Sample No. II (Di-Cup: 2 g): about 5 minutes after incorporation of the predetermined amount of Di-Cup, a milled mass began to become slightly hard so that the turnover operation became easy. Thereafter, no change in the state of the milled mass was recognized.

Sample No. III (Di-Cup: 4 g): about 5 minutes after incorporation of the predetermined amount of Di-Cup, a milled mass began to become slightly hard so that the turnover operation became easy. 9 minutes thereafter, the milled mass began to become leather-like. Milling was continued.

Sample No. IV (Di-Cup: 6 g): about 4 minutes after incorporation of the predetermined amount of Di-Cup, a milled mass began to become slightly hard so that the turnover operation became easy. 8 minutes thereafter, the milled mass began to become leather-like. Milling was continued. The milled mass was more leather-like than that of Sample No. III.

Sample No. V (Di-Cup: 8 g): about 4 minutes after incorporation of the predetermined amount of Di-Cup, a milled mass began to become leather-like. 6 minutes thereafter, the milled mass was hardened to become completely leather-like so that milling was terminated.

From the above results, it can be understood that, when up to 4 g of Di-Cup is used, a milled mass does not become leather-like. This suggests that the reaction of polymer radicals onto the surfaces of electrically conductive particles is preferential to the reaction of network formation of the polymer. If the crosslinking reaction of the polymer proceeded simultaneously, the milled mass must have turned into a leather-like mass because of network formation. When the amount of Di-Cup is 4 g or larger, a milled mass becomes leather-like during milling. This suggests that, once the preferential reaction of polymer radicals onto the surfaces of electrically conductive particles is completed, a surplus of Di-Cup serves as the crosslinking agent for the polymer to promote network formation in a milled mass.

From the above, if may be presumed that the necessary amount of Di-Cup as the grafting agent is about 4 g per 100 g of electrically conductive particles. This value is close to the theoretically calculated value mentioned hereinbefore.

Description will be made of the state of molding of a milled mass and the residual organic peroxide. A milled mass was crushed, with a crusher, into chips having a size of about 1 to 5 mm, which was used as a molding material. Molding was conducted with a 26 t compression molding machine provided with a mold. The procedure of molding comprises the following steps ① to ⑤.

① about 5 g of a molding material is weighed,

② the molding machine is provided with the mold, which is then heated to a temperature of 180° C., ③ the molding material is placed into the mold, pressed with the molding machine (50 kg/cm²), and kept in the mold for 5 minutes, ④ immediately thereafter, the mold is taken out of the molding machine and opened, and ⑤ the state of molding is observed.

The results of observation of the state of molding were as follows. In the cases of Samples Nos. I and II, moldings were not hardened, thus proving that molding was impossible. In the case of Sample No. III, a molding was slightly hardened but the shape of the molding was not desirable. In the cases of Samples Nos. IV and V, moldings were hardened, thus proving that molding was possible.

From the above results, it may be presumed that the milled masses of Samples Nos. IV and V contained the residual organic peroxide, which contributed to crosslinking of the polymer to form a three-dimensional network structure during milling.

Examples will now be described.

EXAMPLES 1

First and second organic peroxides were separately added as a grafting agent and a crosslinking agent, respectively, during the course of milling with a heated roll mill to graft polyethylene onto the surfaces of carbon black and graphite particles and further crosslink the grafted polyethylene and the ungrafted polyethylene between molecules thereof to thereby form a network.

40 g of furnace black (Vulcan XC 72) and 60 g of graphite (natural graphite ACP-1000) were added to 100 g of polyethylene (melting point: 131° C.), to which 3 g of Di-Cup (Percumyl D) was then further added as a grafting agent (first organic peroxide). They were heated and milled with the heated roll mill (grafting). Subsequently, 5 g of TBPH-3 (Perhexyne 25B-40, concentration: 40%) was added as a crosslinking agent (second organic peroxide) to the resulting milled mass, followed by further milling. The milled mass was formed into a predetermined device shape and heat-treated at 200° C. for 15 minutes (crosslinking) to obtain a device.

It is possible in the step of initial milling to add a suitable amount of a first organic peroxide such as Di-Cup (Percumyl D) and a suitable amount of a second organic peroxide such as TBPH-3 (Perhexyne 25B-40) simultaneously.

Figure 2:
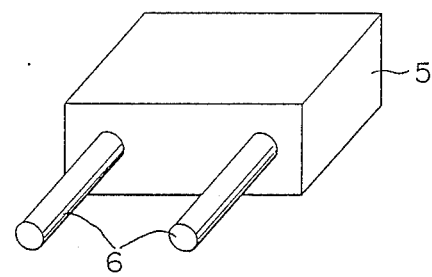
FIG. 2 is a perspective view of a device obtained by the process of the present invention.

The initial volume resistivity of the device 5 obtained in Example 1 which was provided with terminals 6 as shown in FIG. 2 was measured and found to be 2.84 $\Omega$cm. In order to examine the stability of the electric resistance value of the device, a temperature cycle test (one cycle: at 150° C. for 15 minutes and a 25° C. for 15 minutes) was conducted. The rate of change in the electric resistance value relative to the initial value was $-4.6\%$ after the 5th cycle and $-3.6\%$ after the 10th cycle, thus proving that the device had a stable electric resistance.

COMPARATIVE EXAMPLE 1

A device was produced in substantially the same manner as that of Example 1 except that 3 g of Di-Cup alone was added as a grafting agent without addition of any crosslinking agent. The initial volume resistivity of the obtained device was 1.93 $\Omega$cm. The rate of change in the electric resistance value as measured according to the same temperature cycle test as that of Example 1 was 7.6% after the 5th cycle and 12.9% after the 10th cycle.

COMPARATIVE EXAMPLE 2

A device was produced in substantially the same manner as that of Example 1 except that neither grafting agent nor crosslinking agent was added and that the heat treatment at 200° for 15 minutes was dispensed with to avoid deformation of the device. The initial volume resistivity of the obtained device was 0.30 $\Omega$cm. The rate of change in the electric resistance value as measured according to the same temperature cycle test as that of Example 1 was 43.2% after the 5th cycle and 61.2% after the 10th cycle.

COMPARATIVE EXAMPLE 3

A device was produced in substantially the same manner as that of Example 1 except that graphite alone was used without use of carbon black and that 4 g of Di-Cup (Percumyl D) alone was added as the organic peroxide in the step of initial milling. The initial volume resistivity of the obtained device was $3.10 \times 10^3$ $\Omega$cm. The rate of change in the electric resistance value as measured according to the same temperature cycle test as that of Example 1 was $-67.3\%$ after the 5th cycle and $-84.8\%$ after the 10th cycle.

Figure 3:
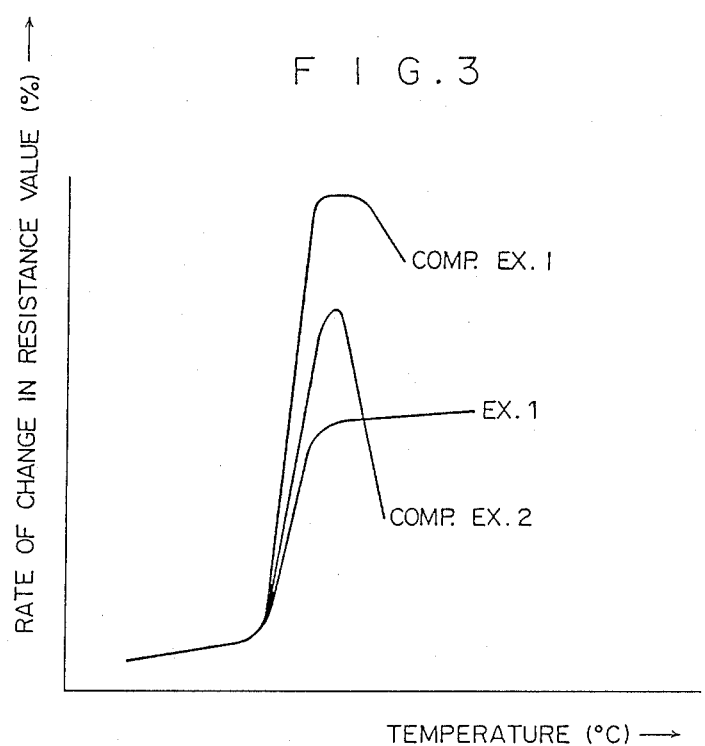
FIG. 3 is a diagram showing a temperature versus rate of change in a resistance value curve of the above-mentioned device.

FIG. 3 shows characteristic curves the temperature versus the rate of change in resistance value of the devices obtained in Example 1 and Comparative Examples 1 and 2. It can be understood from these characteristic curves that, after the manifestation of PTC characteristics, the device of Comparative Example 2 showed notable NTC characteristics and that of Comparative Example 1 showed slightly suppressed NTC characteristics while that of Example 1 showed largely suppressed NTC characteristics.

Figure 4:
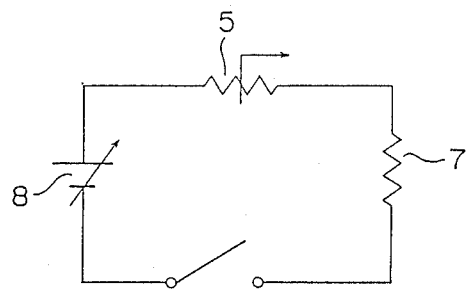
FIG. 4 is a diagram of a circuit using the above-mentioned device.
Figure 5:
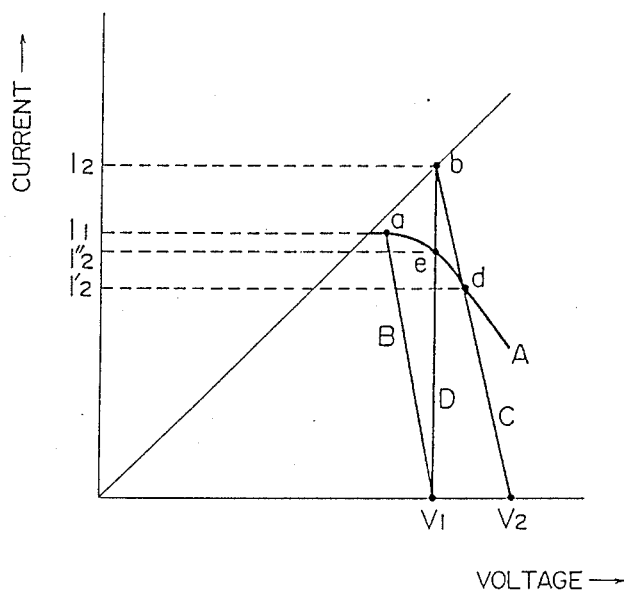
FIG. 5 is a diagram showing a current versus voltage curve of the above-mentioned device.

FIG. 5 shows the static voltage versus current characteristic curve of the device of Example 1 as measured by connecting the device 5 in series to a load 7 and applying a voltage V from a power source 8 to the device 5 as shown in FIG. 4. In the curve A of FIG. 5, the operating point settles at a point a where a steady state is attained without current limitation. This state corresponds to that attained when a rated current flows through a metallic fuse. When the voltage of the power source is changed from $V_1$ to $V_2$, a load line B is replaced by a load line C, whereupon the operating point shifts from the point a to a point b. A current $I_2$ flows through the device 5 and the temperature of the device 5 is raised by heat buildup thereof due to Joule's heat, with the result that the operating point shifts from the point b to a point d with some time lag and the current is finally limited to $I'_2$. Where the voltage of the power source is constant and the load is changed, the load line B is replaced by a load line D and the operating point shifts from the point a to a point b. As a result of heat buildup of the device 5, the operating point shifts from the point b to a point e with some time lag and the current is limited to $I''_2$.

Thus, when an overcurrent flows through a circuit as a result of any change in the power source or the load, the current value can be limited to a rated current or below though the limited current value varies depending on conditions. When the current returns to the rated state, the operating point returns to the point a again. Thus, the device can be repeatedly used as an overcurrent protective device. Accordingly, utilization of these characteristics enables the use of the device as a self-restoring overcurrent protective device.

Figure 6:
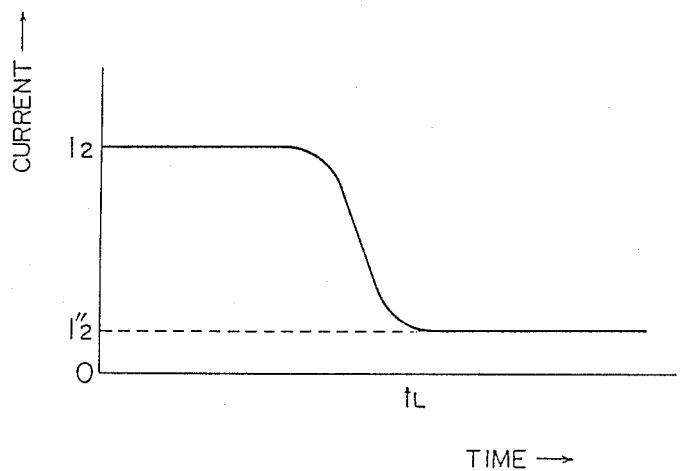
FIG. 6 is a diagram showing a current versus time curve of the above-mentioned device.

FIG. 6 shows the dynamic time versus current characteristic curve of the device 5, which shows a variation of current with time during the course of limitation of the current from $I_2$ to $I''_2$ with shift of the operating point from the point b to the point e in FIG. 5. The time $t_L$ spent during limitation of the current from $I_2$ to $I''_2$ is a current-limiting time.

EXAMPLE 2

This is an example wherein two kinds of carbon blacks were used.

20 g of furnace black (Vulcan XC 72), 20 g of acetylene black (Denka Black); and 60 g of graphite (ACP-1000) were added to 100 g of polyethylene (1300J), to which 3 g of Di-Cup (Percumyl D) and 5 g of TBPH-3 (Perhexyne 25B-40) were then further added as a grafting agent for effecting grafting onto the surfaces of the above-mentioned particles and a crosslinking agent, respectively. A device was produced in substantially the same manner as that of Example 1 except for the above-mentioned materials. The initial volume resistivity of the obtained device was 1.68 Ωcm. The rate of change in the electric resistance value as measured according to the same temperature cycle test as that of Example 1 was 4.5% after the 5th cycle and 5.0% after the 10th cycle.

EXAMPLE 3

This is an example wherein artificial graphite was used.

60 g of furnace black (Vulcan XC 72) and 40 g of graphite (artificial graphite GA-5) were added to 150 g of polyethylene (1300J), to which 3 g of Di-Cup (Percumyl D) and 5 g of TBPH-3 (Perhexyne 25B-40) were then further added as a grafting agent for effecting grafting onto the surfaces of the above-mentioned particles and a crosslinking agent, respectively. A device was produced in substantially the same manner as that of Example 1 except for the above-mentioned materials. The initial volume resistivity of the obtained device was 3.78 Ωcm. The rate of change in the electric resistance value as measured according to the same temperature cycle test as that of Example 1 was 8.9% after the 5th cycle and 14.2% after the 10th cycle.

EXAMPLE 4

This is an example wherein two kinds of polymers were mixed together.

50 g of furnace black (Vulcan XC 72) and 50 g of graphite (ACP-1000) were added to 80 g of polyethylene (1300J) and 40 g of polypropylene (J900P, melting point: about 160° C.), to which 3 g of Di-Cup (Percumyl D) and 5 g of TBPH-3 (Perhexyne 55B-40) were then further added as a grafting agent for effecting grafting onto the surfaces of the above-mentioned particles and a crosslinking agent, respectively. A device was produced in substantially the same manner as that of Example 1 except for the above-mentioned materials. The initial volume resistivity of the obtained device was 4.06 Ωcm. The rate of change in the electric resistance value as measured according to the same temperature cycle test as that of Example 1 was −13.4% after the 5th cycle and −18.7% after the 10th cycle.

EXAMPLE 5

This is an example wherein Ketjen black was used as carbon black.

20 g of Ketjen black (EC) and 80 g of graphite (ACP-1000) were added to 100 g of polyethylene (1300J), to which 3 g of Di-Cup (Percumyl D) and 5 g of TBPH-3 (Perhexyne 25B-40) were then further added as a grafting agent for effecting grafting onto the surfaces of the above-mentioned particles and a crosslinking agent, respectively. A device was produced in substantially the same manner as that of Example 1 except for the above-mentioned materials. The initial volume resistivity of the obtained device was 1.60 Ωcm. The rate of change in the electric resistance value as measured according to the same temperature cycle test as that of Example 1 was 14.2% after the 5th cycle and 18.6% after the 10th cycle.

EXAMPLE 6

This is an example wherein a polyester was used as a crystalline polymer substance.

40 g of furnace black (Vulcan XC 72) and 50 g of graphite (ACP-1000) were added to 100 g of a polyester (polyhexamethylene terephthalate, melting point: 146° C.), to which 2 g of Di-Cup (Percumyl D) and 5 g of TBPH-3 (Perhexyne 25B-40) were then further added as a grafting agent for effecting grafting onto the surfaces of the above-mentioned particles and a crosslinking agent, respectively. A device was produced in substantially the same manner as that of Example 1 except for the above-mentioned materials. The initial volume resistivity of the obtained device was 2.44 Ωcm. The rate of change in the electric resistance value as measured according to the same temperature cycle test as that of Example 1 was 9.1% after the 5th cycle and 5.4% after the 10th cycle.

EXAMPLE 7

This is an example wherein an organic peroxide was initially added as both of a grafting agent and a crosslinking agent without later addition of any organic peroxide.

40 g of furnace black (Vulcan XC 72) and 60 g of graphite (ACP-1000) were added to 100 g of polyethylene (1300J), to which 6 g of Di-Cup (Percumyl D) was then further added as a grafting agent for effecting grafting onto the surfaces of the above-mentioned particles and a crosslinking agent for the polymer. They were heated and milled with a heated roll mill without further addition of any crosslinking agent, then formed into a device shape, and subsequently heat-treated at 200° C. for 15 minutes to produce a device. The initial volume resistivity of the obtained device was 5.24 Ωcm. The rate of change in the electric resistance value as measured according to the same temperature cycle test as that in Example 1 was 12.2% after the 5th cycle and 19.8% after the 10th cycle.

EXAMPLE 8

This is an example wherein two kinds of carbon blacks and two kinds of polymers were mixed together.

60 g of graphite (natural graphite ACP-100), 20 g of furnace black (Vulcan XC 72), and 20 g of Ketjen black (EC) were added to 120 g of polyethylene (1300J) and 30 g of polypropylene (J900P), to which 3 g of Di-Cup (Percumyl D) and 5 g of TBPH-3 (perhexyne 25B-40) were then further added as a grafting agent for effecting grafting onto the surfaces of the above-mentioned particles and a crosslinking agent, respectively.

A device was produced in substantially the same manner as that of Example 1 except for the abovementioned materials. The initial volume resistivity of the obtained device was 5.78 Ωcm. The rate of change in the electric resistance value as measured according to the same temperature cycle test as that in Example 1 was 7.4% after the 5th cycle and 8.3% after the 10th cycle.

EXAMPLE 9

This is an example wherein three kinds of carbon blacks and two kinds of polymers were mixed together.

10 g of furnace black (Vulcan XC 72), 10 g of acetylene black (Denka Black), 20 g of Ketjen black (EC), and 60 g of graphite (natural graphite ACP-1000) were added to 120 g of polyethylene (1300J) and 30 g of polypropylene (J900P), to which 3 g of Di-Cup (Percumyl D) and 5 g of TBPH-3 (Perhexyne 25B-40) were then further added as a grafting agent for effecting grafting onto the surfaces of the above-mentioned particles and a crosslinking agent, respectively. A device was produced in substantially the same manner as that of Example 1 except for the above-mentioned materials. The initial volume resistivity of the obtained device was 2.99 Ωcm. The rate of change in the electric resistance value as measured according to the same temperature cycle test as that of Example 1 was 8.9% after the 5th cycle and 9.0% after the 10th cycle.

The blending ratios, the results of measurement of the initial volume resistivities, the rates of change in resistance value and the like, and the properties and the like of the materials used in Examples 1 to 9 and Comparative Examples 1 to 3 are summarized in Tables 4 to 6.

TABLE 4

Amounts of Materials [g]

A grade name is shown in ( ).

| | Graphite | | Carbon black | | | Crystalline polymer | | | Organic peroxide | |
| --- | --- | --- | --- | --- | --- | --- | --- | --- | --- | --- |
| | natural graphite (ACP-1000) | artificial graphite (GA-5) | furnace black (Vulcan XC 72) | acetylene black (Denka Black) | Ketjen black (EC) | polyethylene (1300J) | polypropylene (J900P) | polyester | Di-Cup (Percumyl D) [grafting agent] | TBPH (Perhexyne 25B-40) [crosslinking agent] |
| Ex. 1 | 60 | — | 40 | — | — | 100 | — | — | 3 | 5 |
| Ex. 2 | 60 | — | 20 | 20 | — | 100 | — | — | 3 | 5 |
| Ex. 3 | — | 40 | 60 | — | — | 150 | — | — | 3 | 5 |
| Ex. 4 | 50 | — | 50 | — | — | 80 | 40 | — | 3 | 5 |
| Ex. 5 | 80 | — | — | — | 20 | 100 | — | — | 3 | 5 |
| Ex. 6 | 50 | — | 40 | — | — | — | — | 100 | 2 | 5 |
| Ex. 7 | 60 | — | 40 | — | — | 100 | — | — | 6 (Percumyl D) | |
| Ex. 8 | 60 | — | 20 | — | 20 | 120 | 30 | — | 3 | 5 |
| Ex. 9 | 60 | — | 10 | 10 | 20 | 100 | 20 | — | 3 | 5 |
| Comp. Ex. 1 | 60 | — | 40 | — | — | 100 | — | — | 3 | — |
| Comp. Ex. 2 | 60 | — | 40 | — | — | 100 | — | — | — | — |
| Comp. Ex. 3 | 100 | — | — | — | — | 100 | — | — | 4 (Percumyl D) | |

TABLE 5

Results of Ex. and Comp. Ex.

| | Initial volume resistivity [Ω cm] | Rate of change in resistance by temp. cycle test (after 5th cycle) [%] | (after 10th cycle) [%] | PTC characteristics | Remarks |
| --- | --- | --- | --- | --- | --- |
| Ex. 1 | 2.84 | −4.6 | −3.6 | shown | This Example should be compared in characteristics with Comp. Ex. 1 and 2. |
| Ex. 2 | 1.68 | 4.5 | 5.0 | shown | Example wherein furnance black was mixed with acetylene black. |
| Ex. 3 | 3.78 | 8.9 | 14.2 | shown | Example wherein artificial graphite was used. |

TABLE 5-continued

Results of Ex. and Comp. Ex.

| | Initial volume resistivity [Ω cm] | Rate of change in resistance by temp. cycle test (after 5th cycle) [%] | (after 10th cycle) [%] | PTC characteristics | Remarks |
|---|---|---|---|---|---|
| Ex. 4 | 4.06 | −13.4 | −18.7 | shown | Example wherein two kinds of polymers, polyethylene and polypropylene, were mixed together. |
| Ex. 5 | 1.60 | 14.2 | 18.6 | shown | Example wherein Ketjen black used. |
| Ex. 6 | 2.44 | 9.1 | 5.4 | shown | Example wherein a polyester was used. |
| Ex. 7 | 5.24 | 12.2 | 19.8 | shown | Example wherein a grafting agent and a crosslinking agent were initially added simultaneously. |
| Ex. 8 | 5.78 | 7.4 | 8.3 | shown | Example wherein two kinds of polymers, polyethylene and polypropylene, were used in combination in a system wherein furnace black was blended with Ketjen black. |
| Ex. 9 | 2.99 | 8.9 | 9.0 | shown | Example wherein two kinds of polymers, polyethylene and polypropylene, were used in combination in a system wherein furnace black was blended with Ketjen black and acetylene black. |
| Comp. Ex. 1 | 1.93 | 7.6 | 12.9 | shown | This Example should be compared with Ex. 1. |
| Comp. Ex. 2 | 0.30 | 43.2 | 61.2 | shown | This Example should be compared with Ex. 1. |
| Comp. Ex. 3 | $31.0 \times 10^3$ | −67.3 | −84.8 | shown | Comparative Example wherein graphite alone was used without use of carbon black. |

TABLE 6

| Division | Kind | Materials Grade name (chemical name) | Maker | Properties |
|---|---|---|---|---|
| Graphite | natural graphite | ACP-1000 | Nippon Kokuen Kogyo K.K. | particle size: 6 μm |
| | artificial graphite | GA-5 | Nippon Carbon Co., Ltd. | particle size: 40 μm |
| | | KS-15 | Ronza, Switzerland | particle size: 8 μm |
| Carbon black | furnace black | Vulcan XC 72 | Cabot, U.S.A. | oil absorption: 1.78 ml/g |
| | | AG-300 | Asahi Carbon K.K. | oil absorption: 3 ml/g |
| | acetylene black | Denka Black | Denki Kagaku Kogyo K.K. | oil absorption: 1.15 ml/g |
| | Ketjen black | EC | Nippon EC K.K. | oil absorption: 3.5 ml/g |
| Crystalline polymer | polyethylene | 1300J | Mitsui Petrochemical Industries, Ltd. | m.p.: 131° C. |
| | polypropylene | J900P | Mitsui Petrochemical Industries, Ltd. | m.p.: 160°. C. |
| | polyester | (polyhexamethylene terephthalate) | — | m.p.: 146° C. |
| Organic peroxide | Di-Cup | Percumyl D | Nippon Oil and Fats Co., Ltd. | half-life: 171° C., 1 min. |
| | TBPH-3 | Perhexyne 25B-40 | Nippon Oil and Fats Co., Ltd. | half-life: 193° C., 1 min. TBPH-3 content: 40% |

In Table 5, the rate of change in the resistance value of the device of Comparative Example 1 is better than those of the devices of some Examples. As shown in FIG. 3, however, the device of Comparative Example 1 shows the NTC phenomenon when the temperature thereof is further raised after the manifestation of the PTC phenomenon. This results in a drastic reduction in the current-limiting characteristics of the device as an overcurrent protective device. The device of Comparative Example 2 also shows the same phenomenon.

The low initial volume resistivity of the device of Comparative Example 2 as shown in Table 5 is due to the presence of aggregates of particles in the crystalline polymer substance which resulted from the poor dispersibility of the graphite and the carbon black attributed to the fact that no organic peroxide was used so that the polymer substance was not grafted onto the graphite and the carbon black. This is substantiated by the rate of change in the initial resistance value as measured according to the temperature cycle test.

In Table 5, the device of Comparative Example 3 has a very high initial volume resistivity, which is attributed to the fact that no carbon black was blended. Further, the device of Comparative Example 3 shows a very high rate of change in the resistance value.

Effects of the Invention

Where a crystalline polymer substance is milled in the presence of graphite and carbon black particles using an organic peroxide as a reaction catalyst, the milling time is shortened to suppress the thermal decomposition of the organic peroxide for preventing the crosslinking of the polymer substance due to the decomposition of the organic peroxide according to the conventional process, whereas, according to the process of the present invention, a suitable amount of the organic peroxide is determined and heated together with the other materials at or above the thermal decomposition temperature thereof while sufficiently milling them to graft part of the polymer substance onto the surfaces of the particles, whereby the compatibility of the particles with the polymer substance can be improved. In the latter case, therefore, the carbon black is broken into primary particles and homogeneously dispersed in the polymer substance.

Accordingly, a device having a significantly reduced scattering of resistance value can be obtained as an overcurrent protective device. Further, in the process of the present invention, the polymer substance is cross-linked between the molecules thereof after the completion of milling to form a three-dimensional network structure involving the graphite and carbon black particles therein, which enables the order of the electrically conductive particles, even after repeated manifestation of the PTC phenomenon (current-limiting actions), to return to the original state to provide an effect of restoring the resistance value stably to the original value. Moreover, the network structure serves to retain the shape of the device even in a temperature range where the crystalline polymer is molten, and to provide an effect of suppressing the NTC phenomenon after the manifestation of the PT phenomenon.

What is claimed is:

1. A process for producing a self-restoring overcurrent protective device by the grafting method characterized by comprising the steps of adding a suitable amount of organic peroxide as a reaction catalyst to a mixture consisting of colloidal graphite, at least one kind of carbon black selected from among acetylene black, Ketjen black and furnace black having a high structure, and one or more kinds of crystalline polymer substances, heating the mixture at a temperature higher than the thermal decomposition temperature of the organic peroxide so as to have a high viscosity, forcibly milling the mixture, whereby the organic peroxide is reacted with the polymer substance to give unpaired electrons to the polymer substance to thereby form polymer radicals, grafting the formed polymer radicals onto said graphite and carbon black to form a milled mass wherein the grafting products having such a structure that said polymer substance is combined with said graphite and carbon black are homogeneously dispersed in the form of primary particles in said polymer substance, molding the milled mass having a thermoplasticity into a predetermined shape, and thermally decomposing said organic peroxide not involved in the formation of said polymer radicals to add a cross-linking structure between said grafting products and polymer substance.

2. A process for producing a self-restoring overcurrent protective device by the grafting method characterized by comprising the steps of adding a suitable amount of a first organic peroxide as a reaction catalyst to a mixture consisting of colloidal graphite, at least one kind of carbon black selected from among acetylene black, Ketjen black and furnace black having a high structure, and one or more kinds of crystalline polymer substances, heating the mixture at a temperature higher than the thermal decomposition temperature of the first organic peroxide so as to have a high viscosity, forcibly milling the mixture, whereby the organic peroxide is reacted with the polymer substance to give unpaired electrons to the polymer substance to thereby form polymer radicals, grafting the formed polymer radicals onto said graphite and carbon black to form a milled mass wherein the grafting products having such a structure that said polymer substance is combined with said graphite and carbon black are homogeneously dispersed in said polymer substance, adding a second organic peroxide to the milled mass, molding the milled mass having a thermoplasticity into a predetermined shape, and thermally decomposing said second organic peroxide to add a crosslinking structure between said grafting products and polymer substance.

3. The process for producing a self-restoring overcurrent protective device by the grafting method according to claim 2, wherein said second organic peroxide is the same material with said first organic peroxide.

4. The process for producing a self-restoring overcurrent protective device by the grafting method according to claim 2, wherein said second organic peroxide is a material more stable at a high temperature than said first organic peroxide.

5. A process for producing a self-restoring overcurrent protective device by the grafting method characterized by comprising the steps of adding a suitable amount of a first organic peroxide as a reaction catalyst to a mixture consisting of colloidal graphite, at least one kind of carbon black selected from among acetylene black, Ketjen black and furnace black having a high structure, and one or more kinds of crystalline polymer substances, heating the mixture at a temperature higher than the thermal decomposition temperature of the first organic peroxide so as to have a high viscosity, forcibly milling the mixture, whereby the organic peroxide is reacted with the polymer substance to give unpaired electrons to the polymer substance to thereby form polymer radicals, grafting the formed polymer radicals onto said graphite and carbon black to form a milled mass wherein the grafting products having such a structure that said polymer substance is combined with said graphite and carbon black are homogeneously dispersed in said polymer substance, molding the milled mass having a thermoplasticity into a predetermined shape, and irradiating radial ray onto the molded mass to add a crosslinking structure between said grafting products and polymer substance.

* * * * *